(12) United States Patent
Xing et al.

(10) Patent No.: US 10,310,705 B2
(45) Date of Patent: Jun. 4, 2019

(54) MENU DISPLAY CONTROL

(71) Applicant: HEWLETT PACKARD ENTERPRISE DEVELOPMENT LP, Houston, TX (US)

(72) Inventors: Jiang-Bin Xing, Shanghai (CN); Qian Lu, Shanghai (CN); Chun-Qi Lu, Shanghai (CN); Wen-Ying Yang, Shanghai (CN); Bing Zhang, Shanghai (CN)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 74 days.

(21) Appl. No.: 15/529,467

(22) PCT Filed: Dec. 5, 2014

(86) PCT No.: PCT/CN2014/093088
§ 371 (c)(1),
(2) Date: May 24, 2017

(87) PCT Pub. No.: WO2016/086400
PCT Pub. Date: Jun. 9, 2016

(65) Prior Publication Data
US 2017/0262156 A1 Sep. 14, 2017

(51) Int. Cl.
*G06F 3/0481* (2013.01)
*G06F 3/0482* (2013.01)
*G06F 3/033* (2013.01)

(52) U.S. Cl.
CPC .......... *G06F 3/04817* (2013.01); *G06F 3/033* (2013.01); *G06F 3/0482* (2013.01); *G06F 3/04812* (2013.01)

(58) Field of Classification Search
CPC .................................................. G06F 3/04817
(Continued)

(56) References Cited

U.S. PATENT DOCUMENTS

| 5,727,175 A | 3/1998 | Malone et al. |
| 8,423,912 B2 | 4/2013 | Irani et al. |

(Continued)

FOREIGN PATENT DOCUMENTS

| CN | 1825261 | 8/2006 |
| CN | 102449588 | 5/2012 |

OTHER PUBLICATIONS

Tanvir et al. Improving Cascading Menu Selections With Adaptive Activation Areas, Published by Elseier Ltd, Jul. 5, 2011, International Journal of Human-Computer Studies 69 (2011) pp. 769-785.*

(Continued)

*Primary Examiner* — William D Titcomb

(57) ABSTRACT

According to an example, a position of a pointer may be detected to be positioned over an icon of a plurality of selectable icons. A menu containing a set of sub-icons corresponding to the icon may be displayed and a first location and a second location of the displayed menu may be determined. A first line and a second line may be determined and a plurality of points in a movement of the pointer may be recorded. A third line that crosses the plurality of recorded points may also be determined. In response to a determination that the third line is within an area between the first line and the second line, the menu may continue to be displayed while the pointer passes over another icon of the plurality of selectable icons.

15 Claims, 6 Drawing Sheets

(58) Field of Classification Search
USPC .................................................... 715/835
See application file for complete search history.

(56) References Cited

U.S. PATENT DOCUMENTS

| | | | | |
|---|---|---|---|---|
| 8,549,432 | B2* | 10/2013 | Warner | G06F 3/0482 |
| | | | | 715/834 |
| 8,552,992 | B1* | 10/2013 | Kim | G06F 3/0234 |
| | | | | 345/173 |
| 9,223,474 | B2* | 12/2015 | Pearce | G06F 3/04883 |
| 10,042,547 | B2* | 8/2018 | Zhao | G06F 3/0481 |
| 10,048,839 | B2* | 8/2018 | Boshoff | G06F 3/0482 |
| 10,127,239 | B2* | 11/2018 | Torii | G06F 21/6218 |
| 2004/0104940 | A1* | 6/2004 | Giacomelli | G06F 3/0481 |
| | | | | 715/769 |
| 2009/0172597 | A1* | 7/2009 | Mercer | G06F 3/0488 |
| | | | | 715/840 |
| 2010/0192102 | A1* | 7/2010 | Chmielewski | G06F 3/04817 |
| | | | | 715/834 |
| 2010/0192103 | A1* | 7/2010 | Cragun | G06F 3/04817 |
| | | | | 715/834 |
| 2011/0320984 | A1* | 12/2011 | Irani | G06F 3/0482 |
| | | | | 715/841 |
| 2014/0330694 | A1* | 11/2014 | Barker | G06Q 40/04 |
| | | | | 705/37 |
| 2015/0163345 | A1* | 6/2015 | Cornaby | G06F 3/04847 |
| | | | | 345/633 |

OTHER PUBLICATIONS

Anthony, Why Hover Menus Do Users More Harm Than Good, Jan. 11, 2003, 17 pages http://uxmovement.com/navigation/why-hover-menus-do-users-more-harm-than-good/.

Sorens, M., Creating WPF Prototypes with Sketchflow, Jun. 18, 2010, 20 pages https://www.simple-talk.com/dotnet/.net-tools/creating-wpf-prototypes-with-sketchflow/.

International Search Report & Written Opinion received in PCT Application No. PCT/CN2014/093088, dated Sep. 9, 2015, 11 pages.

* cited by examiner

MENU DISPLAY CONTROL

CLAIM FOR PRIORITY

The present application is a national stage filing under 35 U.S.C. § 371 of PCT application number PCT/CN2014/093088, having an international filing date of Dec. 5, 2014, the disclosure of which is hereby incorporated by reference in its entirety.

BACKGROUND

The use of menus has become ubiquitous in the graphical user interfaces (GUIs) of many electronic devices such as desktop computers, laptops, tablet computers, smartphones, and media player devices. Many GUIs present information or options to users in menus and sub-menus. Particularly, GUIs often display icons or other objects in an arranged menu and selection of an icon in the menu sometimes results in the display of a popup menu that provides users with additional options. In addition, selection of other icons often results in the display of other popup menus.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are methods and apparatuses for controlling a menu display. According to an example, the methods and apparatuses disclosed herein provide users with enhanced behavioral control over the display of menus, and particularly, popup menus. That is, for instance, instead of automatically closing a popup menu as a pointer is moved from a first icon to a sub-icon displayed in a popup menu as may occur when the pointer is moved over another icon, the popup menu may remain displayed during the pointer movement. In other examples, the popup menu may be closed and another popup menu may be displayed if the pointer is positioned over another icon for a predefined period of time. As such, for instance, a popup menu corresponding to a first icon may be prevented from unintentionally closing during a natural, e.g., direct, movement of a pointer from the first icon to a sub-icon displayed in a popup menu.

As discussed in greater detail herein, a user's intent with regard to maintaining the display of a popup menu may be determined through calculation of a motion trail that a pointer follows after the popup menu has been displayed. According to an example, the Pythagorean theorem is used to determine whether the motion trail is within a determined boundary formed by a pair of lines. In response to the motion trail being within the determined boundary, the popup menu may remain displayed. However, in response to the motion trail being outside of the determined boundary, the popup menu may be closed or otherwise cease to be displayed. The popup menu may also be closed, for instance, if the pointer is determined to be positioned over another icon for a predefined length of time.

Figure 1A:
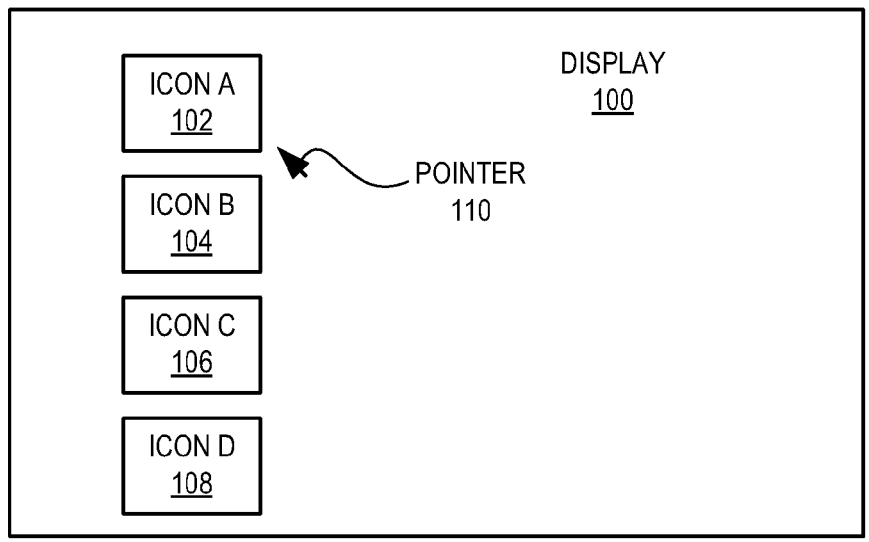
FIGS. 1A-1D, respectively, show simplified diagrams of a display during different operating display states, according to an example of the present disclosure.

With reference to FIG. 1A, there is shown a simplified diagram of a display 100 on which various features of the methods disclosed herein may be displayed, according to an example. It should be understood that the display 100 depicted in FIG. 1A may include additional elements and that some of the elements depicted therein may be removed and/or modified without departing from a scope of the display 100.

According to an example, the display 100 may be a display of an electronic device or otherwise connected to an electronic device (not shown). For instance, the display 100 may be the display of a smartphone, a tablet computer, a laptop computer, a television monitor, or the like. As another example, the display 100 may be a monitor that is connected to a desktop computer, a laptop computer, or the like. In any regard, the display 100 may display various information and may provide a graphical user interface (GUI) through which a user may manipulate operations of the display 100 and/or an electronic device connected to the display 100.

A plurality of icons 102-108 and a pointer 110 are depicted in FIG. 1A as being displayed on the display 100. The icons 102-108, which are also referred to herein as objects 102-108, are depicted as being arranged in a vertically aligned manner with respect to each other. According to an example, the icons 102-108 may be part of a sidebar or other arrangement of icons 102-108 and may be user-selectable, such that selection of an icon 102 causes an action to occur as described in greater detail herein below. That is, a user may maneuver the pointer 110, which may also be referred to as a selector, a cursor, etc., around the display 100 to control various operations with respect to the display 100. The user may maneuver the pointer 110 through interaction with an interface such as a mouse, a trackball, a touchscreen, a trackpad, etc.

Figure 1B:
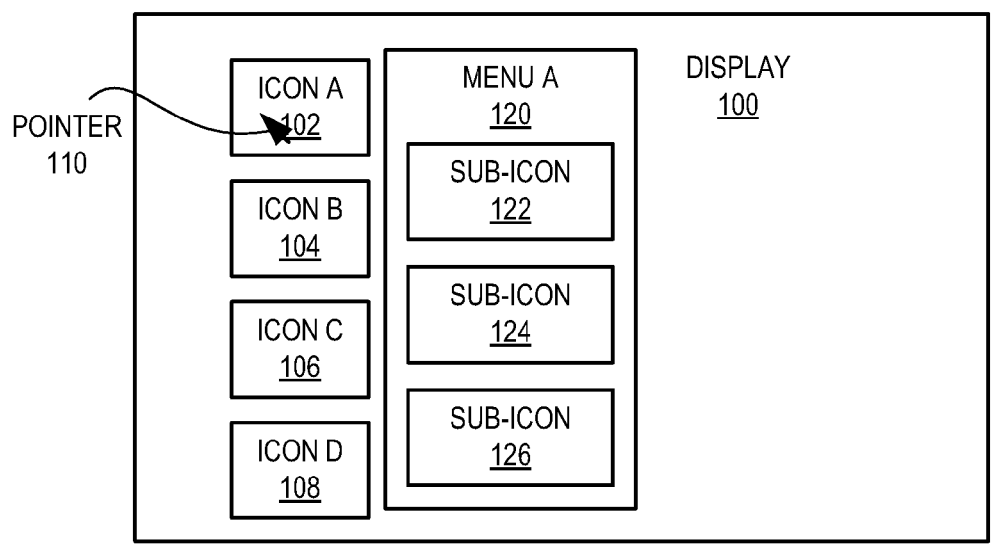
Figure 1C:
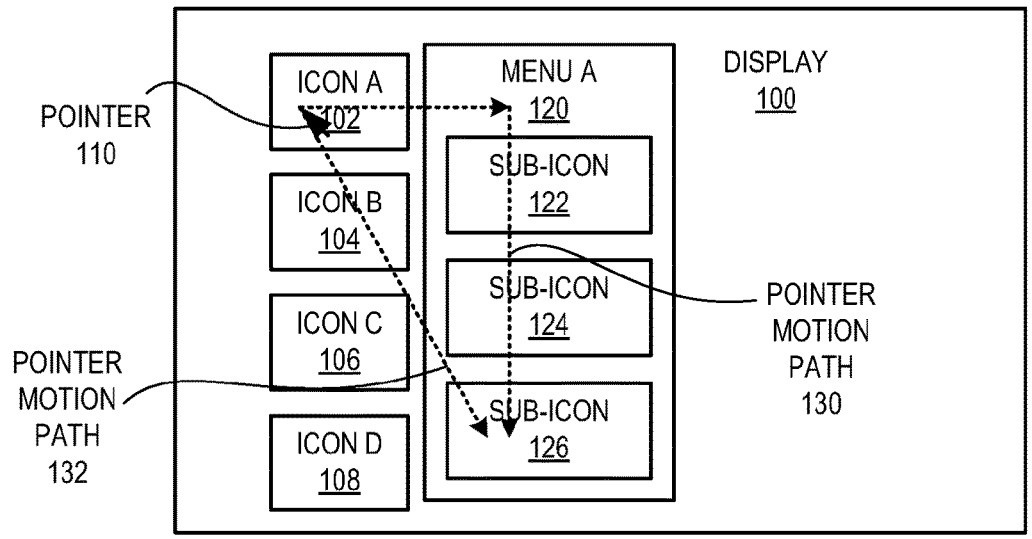

As shown in FIG. 1B, the user may maneuver the pointer 110 over one of the icons 102 to select the icon 102. In one example, the icon 102 may be selected when the pointer 110 is positioned over the icon 102 for a predetermined length of time. For instance, the icon 102 may automatically be selected if the pointer 110 is positioned over, e.g., in a hovering position, over the icon 102 for one second, a couple of seconds, or the like. In another example, the icon 102 may be selected following a direct input by a user such as through a mouse click or other manual selection of the icon 102.

In any of the examples above, selection of the icon 102 may result in the display of a menu 120 containing a set of sub-icons 122-126, or equivalently, a set of sub-objects 122-126. The icons 102-108 and the sub-icons 122-126 may each be any of thumbnails, hyper-link texts, texts, or the like. As shown in FIG. 1B, the menu 120 may be displayed at a location that is adjacent to the icons 102-108 as a popup menu. In addition, the menu 120 and the sub-icons 122-126 may correspond to the selected icon 102 such that different menus and sub-icons may be displayed for different ones of the icons 102-108. As such, in instances where the icons 102-108 are automatically selected when the pointer 110 is positioned over the icon for a predetermined length of time, a different menu may be displayed as the pointer 110 is moved over the icons 102-104. An example of this possibility is depicted in FIG. 1O.

As shown in FIG. 1O, the pointer 110 may be moved toward sub-icon 126 in a number of different manners. In a first manner, as indicated by the pointer motion path 130, the pointer 110 may be moved horizontally to the menu 120 and then vertically to the sub-icon 126. This type of movement prevents the pointer 110 from being moved over any of the other icons 104-108, thus preventing accidental selection of another icon 104-108, which may cause the menu 120 to be closed and another menu to be displayed. However, maneuvering the pointer 110 in this manner may be cumbersome and unnatural as it does not follow a direct path to the sub-icon 126.

A more direct path from the icon 102 to the sub-icon 126 is depicted as pointer motion path 132. The pointer motion path 132 is depicted as traversing another icon 104. In this case, if the speed at which the pointer 110 travels over icon 104 is sufficiently slow such that the pointer 110 is deemed to have hovered over icon 104 for the predetermined length of time, the icon 104 may unintentionally be selected. Selection of the icon 104 may cause the menu 120 to be closed and another menu containing sub-icons that correspond to the icon 104 to be displayed.

To prevent the unintentional selection of an icon that is in the path of a pointer 110 movement from a selected icon 102 to a sub-icon 126 displayed in a menu 120 corresponding to the selected icon 102, techniques as disclosed herein may be implemented. Particularly, movement of the pointer 110 in the direction of the sub-icon 126 may be detected and based upon a processing of that movement, a determination may be made as to whether to continue to display the menu 120 or to close the menu 120.

Figure 1D:
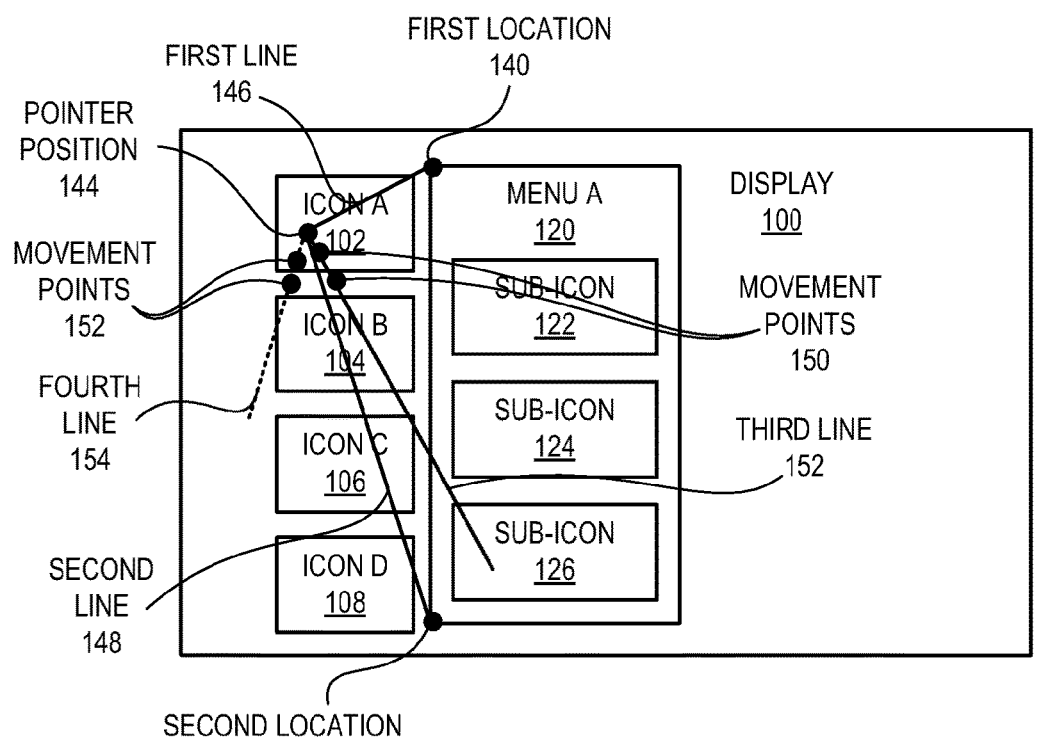

Turning now to FIG. 1D, there are shown various aspects of the above-described technique, according to an example. It should be understood that the black dots and the lines representing the various features described with respect to FIG. 1D are for illustrative purposes only and are thus not intended to be construed as actually being displayed on the display 100. As shown in FIG. 1D, a first location 140 of the menu 120 and a second location 142 of the menu 120 may be determined. The first location 140 may be a top corner of the menu 120 and the second location 142 may be a lower corner of the menu 120. According to an example, the first location 140 and the second location 142 are the closest two corners to the selected icon 102. It should, however, be understood that the first location 140 and the second location 142 may be other locations of the menu 120 without departing from a scope of the methods and apparatuses disclosed herein.

As also shown in FIG. 1D, a pointer position 144 may be determined. The pointer position 144 may be the position at which the pointer 110 is positioned when the icon 102 is selected and the menu 120 is initially displayed. In this regard, the pointer position 144 may be construed as an initial position or location of the pointer 110 prior to the pointer 110 being maneuvered toward a sub-icon 126 following the display of the menu 120. In any regard, a first line 146, which is also referred to herein as a ceiling line 146, may be determined to be a line extending from the first location 140 to the pointer position 144 or vice versa. In addition, a second line 148, which is also referred to herein as a floor line 148, may be determined to be a line extending from the second location 142 to the pointer position 144 or vice versa. As shown in FIG. 1D, an angle is formed between the first line 146 and the second line 148, in which the angle is less than 180 degrees.

A third line 152 may also be determined based upon recorded movement points 150 of the pointer 110. The recorded movement points 150 may be a number of points, e.g., 2, 3, or more points, along the direction of movement of the pointer 110 from the pointer position 144. The third line 152 may be determined as a line that crosses or intersects the recorded movement points 150, for instance, a line that extends along a median position of the recorded movement points 150. In the example shown in FIG. 1D, the third line 152 is depicted as being within an area between the first line 146 and the second line 148. In other words, the third line 152 is depicted as being within a boundary formed by the first line 146 and the second line 148. In this example, if the pointer 110 is moved substantially along the direction of the third line 152 and the pointer 110 thus passes over the icon 104, the menu 120 may continue to be displayed. This may be true even in instances where the pointer 110 hovers over the icon 104 for the predetermined length of time. However, if the pointer 110 is maintained over the icon 104 for a predefined length of time that is greater than the predetermined length of time while following the third line 152, this may be construed as an intent by a user to select the icon 104. In this instance, the menu 120 may be closed and a menu corresponding to the icon 104 may be displayed. The predefined length of time may be, for instance, 2 seconds, 3 seconds, 4 seconds, etc.

In another example, if the pointer 110 were moved in the direction as noted by the recorded movement points 152, for which a fourth line 154 may be determined, such movement may be deemed to be outside of the area between the first line 146 and the second line 148. In this example, the menu 120 may be closed or otherwise cease to be displayed.

In the descriptions of the diagrams depicted in FIGS. 1A-1D, reference is made to particular numbers of icons 102-108 and sub-icons 122-126. It should be clearly understood that these figures merely depict examples and that any number of icons and sub-icons may be displayed without departing from the scopes of the methods and apparatuses disclosed herein. It should also be clearly understood that other modifications may be made to the depicted examples.

Figure 2:
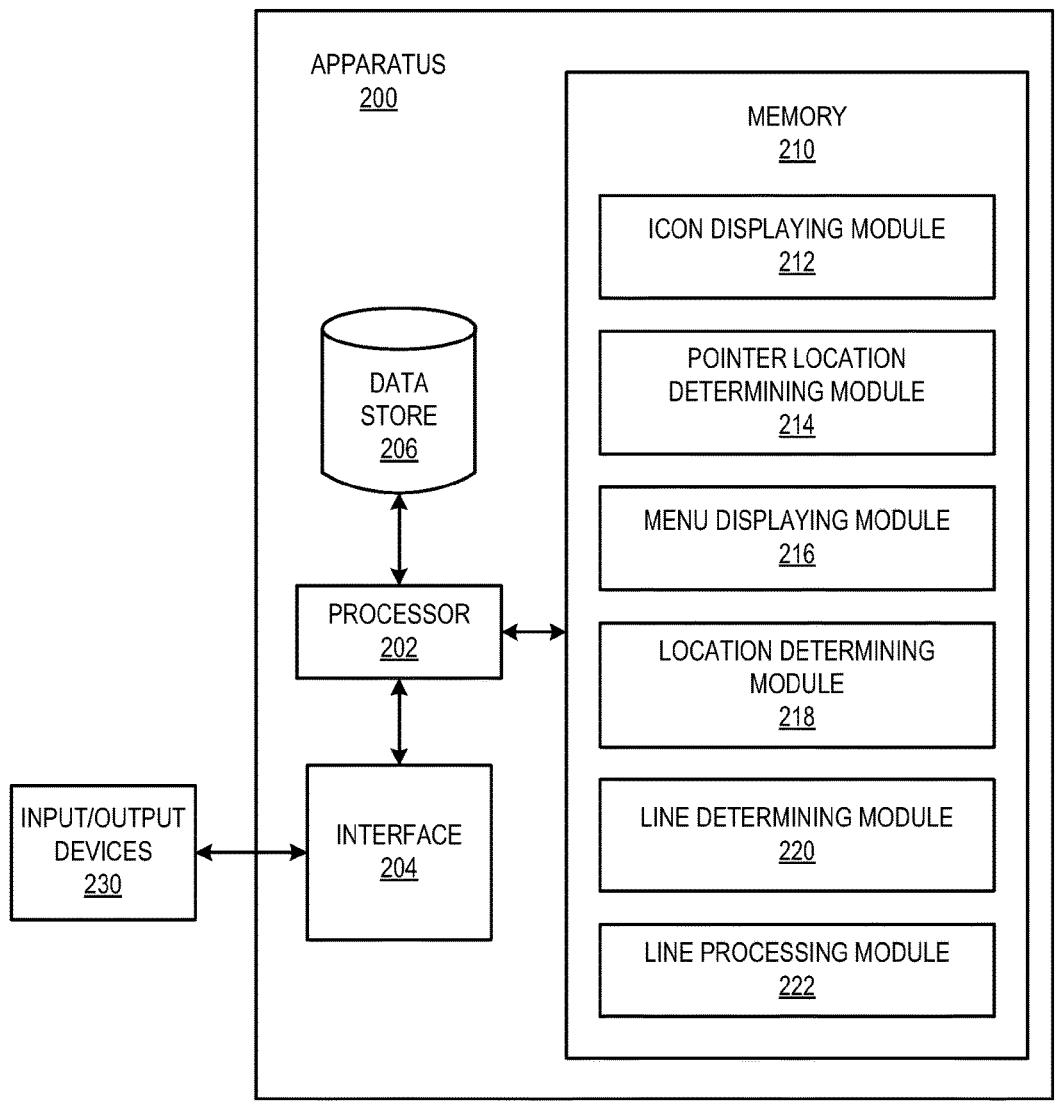
FIG. 2 is a simplified diagram of an apparatus for controlling a menu display, according to an example of the present disclosure.

Turning now to FIG. 2, there is shown a simplified block diagram 200 of an apparatus 200 for controlling a menu display, according to an example. It should be understood that the apparatus 200 depicted in FIG. 2 may include additional elements and that some of the elements depicted therein may be removed and/or modified without departing from a scope of the apparatus 200.

As shown in FIG. 2, the apparatus 200 may include a processor 202, an interface 204, a data store 206, and a memory 210. The memory 210 is also depicted as including an icon displaying module 212, a pointer location determining module 214, a menu displaying module 216, a location determining module 218, a line determining module 220, and a line processing module 222. According to an example, the processor 202 may send and receive instructions to input/output devices 230, e.g., a mouse, a display, a keyboard, etc., through the interface 204 based upon execution or implementation of the modules 212-222. In this regard, the processor 202 may be a hardware processor, such as a central processing unit, an application specific integrated circuit, a graphics processing unit, or the like.

The memory 210 may be a volatile or non-volatile hardware device such as dynamic random access memory (DRAM), electrically erasable programmable read-only memory (EEPROM), magnetoresistive random access memory (MRAM), memristor, flash memory, floppy disk, a compact disc read only memory (CD-ROM), a digital video disc read only memory (DVD-ROM), or other optical or magnetic media, and the like, on which software may be stored. In this example, the modules 212-222 may be software modules, e.g., sets of machine readable instructions, stored in the hardware device 210.

In another example, the memory 210 may be a hardware component, such as a chip component, an integrated circuit component, etc., and the modules 212-222 may be hardware modules on the hardware component. In a further example, the modules 212-222 may be a combination of software and hardware modules.

The data store 206 may be used to store various information related to the operation of and/or used by the processor 202 during implementation of the modules 212-222. For instance, information pertaining to the menus and the sub-icons that correspond to the icons 102-108 may be stored in the data store 206. The data store 206 may be volatile and/or non-volatile memory, such as DRAM, EEPROM, MRAM, phase change RAM (PCRAM), memristor, flash memory, and the like. In addition, or alternatively, the data store 206 may be a device that may read from and write to a removable media, such as, a floppy disk, a CD-ROM, a DVD-ROM, or other optical or magnetic media.

Figure 3:
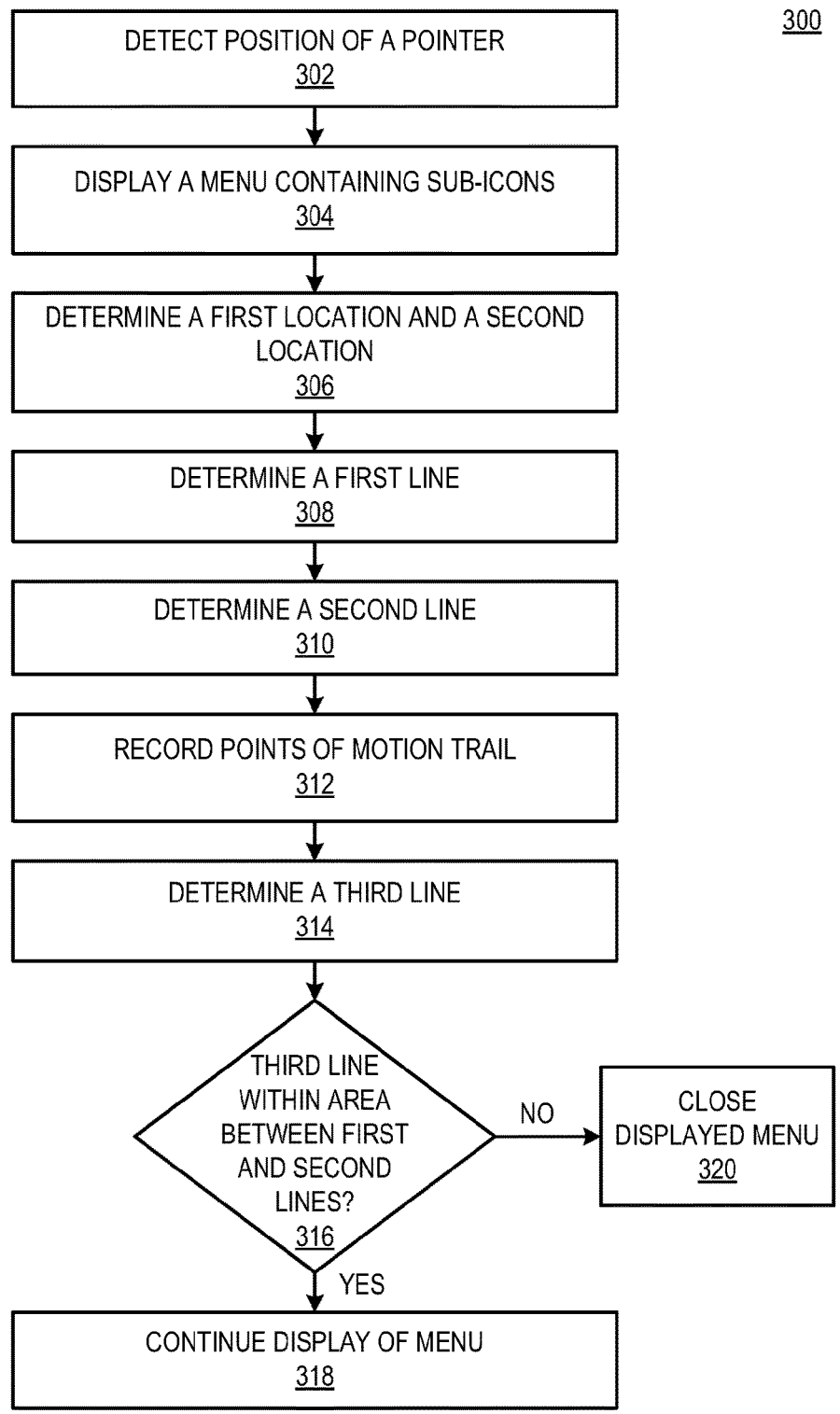
FIG. 3 depicts a flow diagram of a method for controlling a menu display, according to an example of the present disclosure.

Various manners in which the apparatus 200 in general, and the modules 212-222 in particular, may be implemented are discussed in greater detail with respect to the method 300 depicted in FIG. 3. Particularly, FIG. 3 depicts a flow diagram of a method 300 for controlling a menu display, according to an example. It should be apparent to those of ordinary skill in the art that the method 300 may represent a generalized illustration and that other operations may be added or existing operations may be removed, modified, or rearranged without departing from the scopes of the method 300. Generally speaking, the apparatus 200 depicted in FIG. 2 may implement the method 300 through execution of at least some of the modules 212-222.

At block 302, a position 144 of a pointer 110 may be detected. For instance, the icon displaying module 212 may display a plurality of icons 102-108 in an arranged manner with respect to each other. In addition, the pointer location determining module 214 may determine the location 144 of the pointer 110, for instance, when the pointer 110 is positioned over one of the icons 102-108. As discussed above, the pointer position 144 may be the position at which the pointer 110 is located when the icon 102 is selected. In addition, the position 144 of the pointer 110 may be detected as two-dimensional coordinates, such as coordinates in an x-y coordinate system.

At block 304, a menu 120 containing a set of sub-icons 122-126 corresponding to the icon 102 over which the pointer 110 is detected to be positioned may be displayed. For instance, the menu displaying module 216 may display the menu 120 corresponding to the icon 102 when it is determined that the pointer 110 has been positioned over the icon 102 for a predetermined length of time. Alternatively, the menu displaying module 216 may display the menu 120 in response to receipt of an instruction signal, such as a mouse click, from a user. In any regard, the menu displaying module 216 may display the menu 120 at a location that is adjacent or otherwise near the selected icon 104.

At block 306, a first location 140 and a second location 142 of the displayed menu 120 may be determined. For instance, the location determining module 218 may determine where on the display 100 a top corner (first location 140) and a bottom corner (second location 142) of the menu 120 are located. The first location 140 may be the top corner that is closest to the selected icon 102 and the second location 142 may be the bottom corner that is closest to the selected icon 102. In addition, the location determining module 218 may determine the x-y coordinates of the first location 140 and the second location 142 of the displayed menu 120.

At block 308, a first line 146 (ceiling line) from the first location 140 to the pointer position 144 may be determined. For instance, the line determining module 220 may determine where a line extends between the first location 140 and the pointer position 144.

At block 310, a second line 148 (floor line) from the second location 142 to the pointer position 144 may be determined. For instance, the line determining module 220 may determine where a line extends between the second location 142 and the pointer position 144.

At block 312, points (coordinates) in a motion trail of the pointer 110 may be recorded. For instance, the pointer location determining module 214 may track and record the movement points 150 of the pointer 110 as the pointer 110 is moved along a path such as the pointer motion path 132 (FIG. 10). According to an example, the pointer location determining module 214 may record two, three, or more positions near the initial pointer position 144.

At block 314, a third line 152 (motion trail line) that crosses the plurality of recorded points (movement points 150) may be determined. For instance, the line determining module 220 may determine the third line 152 as a line extending from the pointer position 144 and through the movement points 150 as shown in FIG. 1D.

At block 316, a determination may be made as to whether the third line 152 is within an area between the first line 146 and the second line 148. For instance, the line processing module 222 may determine where the angle between the first line 146 and the second line 148 is below 180 degrees and whether the third line 152 is within that angle. According to an example, the line processing module 222 uses the Pythagorean theorem to make this determination.

Figure 4:
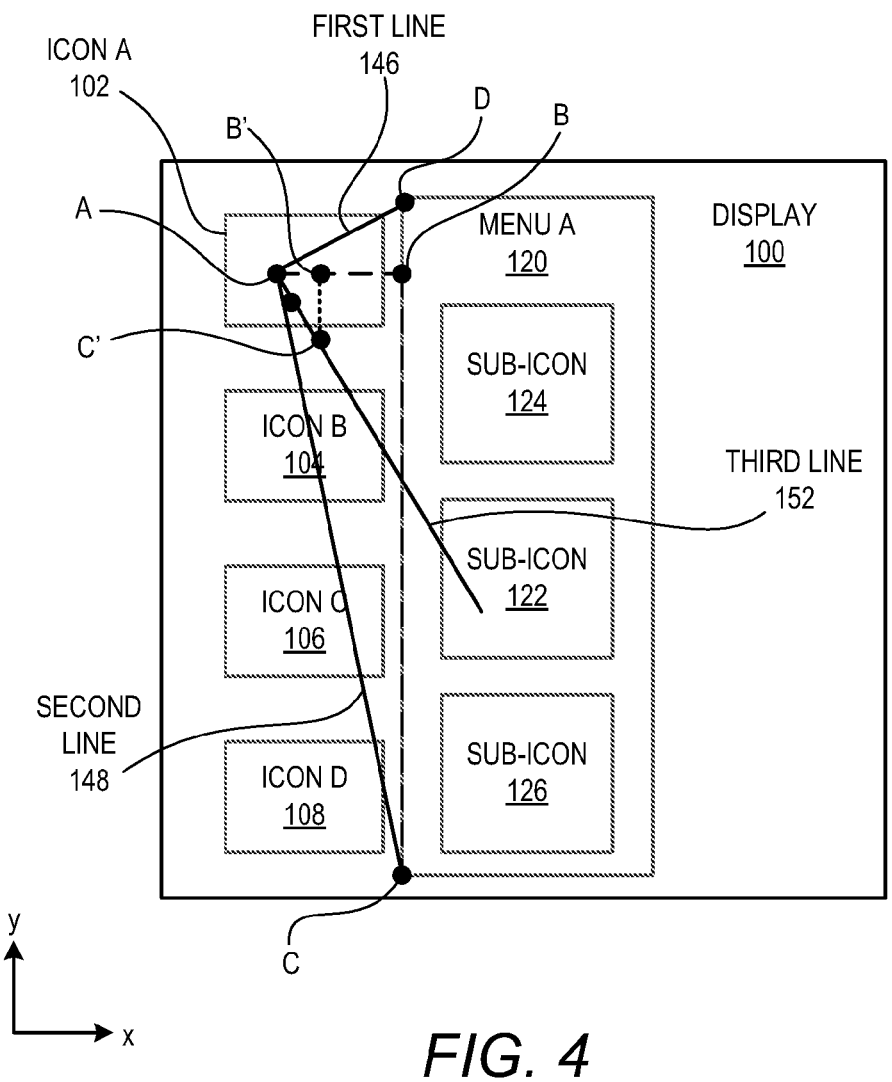
FIG. 4 depicts a diagram of a manner in which the Pythagorean theorem may be used to determine whether a motion trail line is within a boundary formed by a first line and a second line.

An example of a manner in which the line processing module 22 may use the Pythagorean theorem to determine whether the third line 152 is within an area between the first line 146 and the second line 148 will now be described with respect to the diagram depicted in FIG. 4. FIG. 4 depicts many of the same features as those depicted in FIG. 1D and thus the features that are common to both figures will not be described in detail with respect to FIG. 4. As shown in FIG. 4, various points are identified with the letters "A"-"D". Particularly, the letter "A" represents the pointer position 144, the letter "D" represents that first location 140, the letter "C" represents the second location 142, and the letter "C'" represents one of the recorded movement points 150. The letter "B" represents a point between the first location 140 (D) and the second location 142 (C) at which a line from the pointer position 144 (A) is perpendicular to a line between the first location 140 (D) and the second location 142 (C).

The coordinates for the point "B" may be determined from the coordinates of the pointer position 144 (A) and either of the first location 140 (D) and the second location 142 (C). That is, using an x-y coordinate system, the coordinates of the pointer position 144 (A) are $(x_a, y_a)$, the coordinates of the first location 140 (D) are $(x_d, y_d)$, and the coordinates of the second location 142 (C) are $(x_c, y_c)$. In addition, $x_c$ may be equal to $x_d$. The coordinates of the point "B" may thus be calculated to be $(x_c, y_a)$. The lengths of the lines between A and B and between A and C may thus be calculated based upon the known coordinates of the points A, B, and C.

According to the Pythagorean theorem, it is known that the lines between the points AC, AB, and BC are related by the equation $AC^2=AB^2+BC^2$ and therefore, the equation $AC=\sqrt{AB^2+BC^2}$. In addition, the sine value of the corner at A for the triangle formed by the points A, B, and C is sin A=BC/AC.

In order to determine the sin value of the corner at A that includes the third line 152, the line processing module 222 may select one of the recorded movement points 150, which is labeled as "C'" in FIG. 4. The coordinates of C' may be known to the line processing module 222 to be $(x_{c'}, y_{c'})$. Using the same technique as discussed above to determine the coordinates of B, the coordinates of B' may be calculated to be $(x_{c'}, y_a)$. In addition, the sine value of the corner at A for the triangle formed by the points A, B', and C' may be calculated according to sin A'=B'C'/AC'.

The line processing module 222 may determine whether the third line 152 is outside of the area between the first line 146 and the second line 148 based upon a comparison of the values of sin A and sin A'. That is, the line processing module 222 may determine that the third line 152 is outside of the area between the first line 146 and the second line 148 if sin A<sin A' and that the third line 152 is within the area if sin A>sin A'.

Although particular reference has been made to the use of the sine function to determine various values discussed above, it should be clearly understood that other functions, such as the tangent function, may instead be used to make these determinations.

With reference back to FIG. 3, in response to a determination that the third line 152 is within the area between the first line 146 and the second line 148, the menu 120 may continue to be displayed, as indicated at block 318. In addition, blocks 308-318 may be repeated as the pointer 110 is moved toward the sub-icon 126, with different ones of the movement points 150 becoming the initial position 144 and the other recorded movement points 150 of the pointer 110 used to make the determination at block 316 during each iteration of blocks 308-318. In addition, iterations of blocks 308-318 may be repeated as the pointer 110 moves until the pointer 110 reaches the menu 120 or a time-out occurs. However, if the third line 152 is determined to be outside of the area between the first line 146 and the second line 148, the menu 120 may be closed or otherwise cease to be displayed, as indicated at block 320. The menu 120 may also be closed or otherwise cease to be displayed if, for instance, the pointer 110 is determined to be positioned over another icon for a predefined length of time as discussed above. In this example, another menu that corresponds to the another icon may be displayed.

Some or all of the operations set forth in the method 300 may be contained as a utility, program, or subprogram, in any desired computer accessible medium. In addition, the method 300 may be embodied by a computer program, which may exist in a variety of forms both active and inactive. For example, the computer program may exist as machine readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 5:
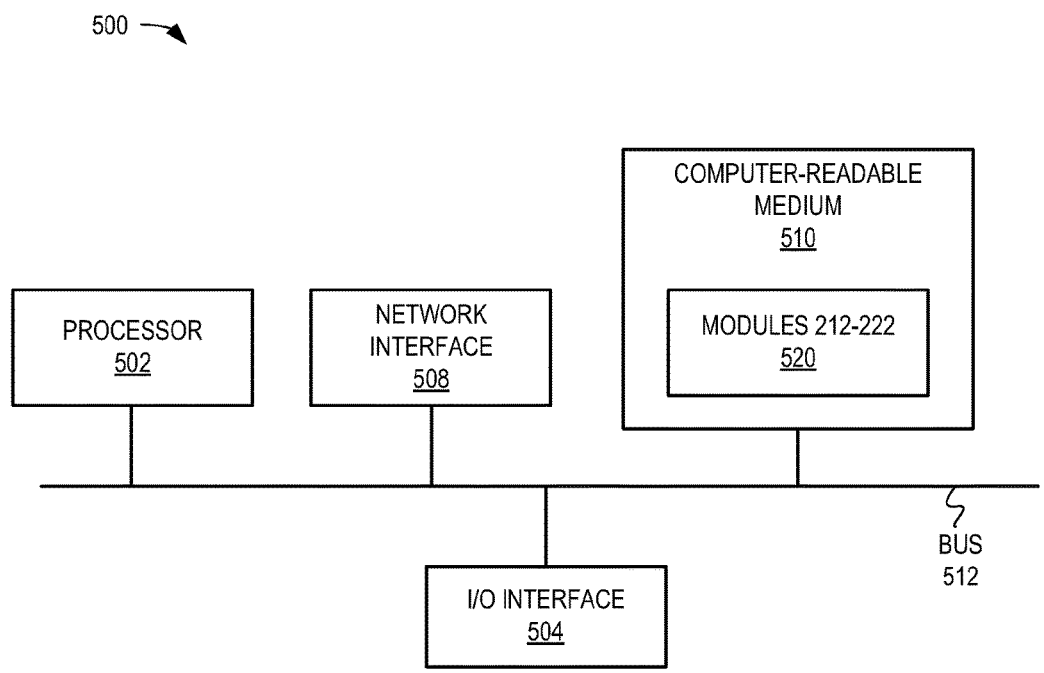
FIG. 5 is schematic representation of a computing device, which may represent the apparatus depicted in FIG. 2, according to an example of the present disclosure.

Turning now to FIG. 5, there is shown a schematic representation of a computing device 500, which may represent the apparatus 200 depicted in FIG. 2, according to an example. The computing device 500 may include a processor 502 and an input/output interface 504. The input/output interface 504 may provide an interface with an input device, such as a keyboard, a mouse, etc., and an output device, such as a display. The computing device 500 may also include a network interface 508, such as a Local Area Network LAN, a wireless 802.11x LAN, a 3G mobile WAN or a WiMax WAN, through which the computing device 500 may connect to a network. The computing device 500 may further include a computer-readable medium 510 on which is stored sets of machine-readable instructions. Each of these components may be operatively coupled to a bus 512, which may be an EISA, a PCI, a USB, a FireWire, a NuBus, a PDS, or the like.

The computer-readable medium 510 may be any suitable medium that participates in providing instructions to the processor 502 for execution. For example, the computer-readable medium 510 may be non-volatile media, such as an optical or a magnetic disk; volatile media, such as memory. As shown, the computer-readable medium 510 may store the icon displaying module 212, the pointer location determining module 214, the menu displaying module 216, the location determining module 218, the line determining module 220, and the line processing module 222.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for controlling a menu display, said method comprising:
 detecting a position of a pointer, wherein the pointer is positioned over an icon of a plurality of selectable icons;

responsive to a determination that the icon is selected, displaying, adjacent to the plurality of selectable icons, a menu containing a set of sub-icons corresponding to the icon;
determining a first location and a second location of the displayed menu;
determining a first line from the position of the pointer to the first location;
determining a second line from the position of the pointer to the second location;
recording a plurality of points in a movement of the pointer;
determining a third line that crosses the plurality of recorded points;
determining whether the third line is within an area between the first line and the second line; and
in response to a determination that the third line is within the area between the first line and the second line, continuing to display the menu while the pointer passes over another icon of the plurality of selectable icons.

2. The method according to claim 1, wherein determining whether the third line is within the area between the first line and the second line further comprises determining whether the third line is within the area between the first line and the second line through performance of calculations involving coordinates of the first location, the second location, and the position of the pointer.

3. The method according to claim 1, wherein the first line, the second line, and the third line meet at the detected position of the pointer, wherein an angle that is less than 180 degrees is formed between the first line and the second line, and wherein determining whether the third line is within an area between the first line and the second line further comprises determining whether the third line is within the angle formed between the first line and the second line.

4. The method according to claim 1, further comprising:
displaying the plurality of selectable icons in an arranged manner on a display; and
displaying the menu as a popup menu adjacent to the displayed plurality of selectable icons.

5. The method according to claim 4, wherein displaying the plurality of selectable icons further comprises displaying the plurality of selectable icons in a vertically arranged manner and wherein the first location is a top corner location of the displayed menu and the second location is a bottom corner location of the displayed menu.

6. The method according to claim 1, wherein displaying the menu further comprises displaying the menu as a pop-up menu.

7. The method according to claim 1, further comprising:
determining that the pointer is positioned over the icon for a predetermined length of time; and
wherein displaying the menu further comprises displaying the menu following the determination that the pointer is positioned over the icon for the predetermined length of time.

8. The method according to claim 1, further comprising:
in response to a determination that the third line is outside of the area between the first line and the second line, closing the displayed menu.

9. The method according to claim 1, further comprising:
determining that the pointer is positioned over another icon of the plurality of selectable icons for a predefined length of time while the menu is displayed and the third line is within the area between the first line and the second line;
closing the displayed menu; and
displaying another menu containing sub-icons corresponding to the another icon.

10. An apparatus for controlling a menu display, said apparatus comprising:
a processor; and
a memory on which is stored machine readable instructions that are to cause the processor to:
display a plurality of selectable objects in an arranged manner;
detect initial coordinates of a selector that is positioned over an object of the plurality of selectable objects;
responsive to a determination that the object is selected, display a menu containing a set of selectable sub-objects adjacent to the plurality of selectable objects;
determine a first location and a second location of the displayed menu;
determine a first line from the initial coordinates to the first location;
determine a second line from the initial coordinates to the second location;
determine an area between the first line and the second line;
record a plurality of coordinates in a motion trail of the selector from the initial coordinates;
determine a third line that crosses the plurality of recorded coordinates from the initial coordinates;
determine whether the third line is within the area between the first line and the second line; and
in response to a determination that the third line is within the area between the first line and the second line, continue to display the menu while the selector passes over another object of the plurality of selectable objects.

11. The apparatus according to claim 10, wherein the machine readable instructions are further to cause the processor to determine whether the third line is within the area between the first line and the second line through performance of calculations involving coordinates of the first location, the second location, and the initial coordinates of the selector.

12. The apparatus according to claim 10, wherein the first line, the second line, and the third line meet at the detected position of the selector, wherein an angle that is less than 180 degrees is formed between the first line and the second line, and wherein, to determine whether the third line is within an area between the first line and the second line, the machine readable instructions are further to determine whether the third line is within the angle formed between the first line and the second line.

13. The apparatus according to claim 10, wherein the machine readable instructions are further to cause the processor to close the displayed menu in response to a determination that the third line is outside of the area between the first line and the second line.

14. The apparatus according to claim 10, wherein the machine readable instructions are further to cause the processor to determine that the selector is positioned over another object of the plurality of selectable objects for a predefined length of time while the menu is displayed and the third line is within the area between the first line and the second line;
close the displayed menu; and
display another menu containing sub-objects corresponding to the another object.

15. A non-transitory computer-readable storage medium on which is stored machine readable instructions that when executed by a processor cause the processor to:

detect initial coordinates of a pointer that is positioned over an object of a plurality of selectable objects;

responsive to a determination that the object is selected, display a popup menu containing a set of selectable sub-objects adjacent to the plurality of selectable objects;

determine a first location and a second location of the displayed menu;

determine a ceiling line from the initial coordinates to the first location;

determine a floor line from the initial coordinates to the second location;

record a plurality of coordinates in a motion trail of the pointer;

determine a motion trail line that crosses the plurality of recorded coordinates;

determine whether the motion trail line is within a boundary between the ceiling line and the floor line; and in response to a determination that the motion trail line is within the boundary between the first line and the second line, continue to display the menu while the pointer passes over another object of the plurality of selectable objects.

\* \* \* \* \*